United States Patent
Chan et al.

(10) Patent No.: US 7,362,833 B1
(45) Date of Patent: Apr. 22, 2008

(54) DYNAMIC SPECIAL CHARACTER SELECTION FOR USE IN BYTE ALIGNMENT CIRCUITRY

(75) Inventors: Vinson Chan, Fremont, CA (US);
Chong Lee, San Ramon, CA (US);
Rakesh Patel, Cupertino, CA (US);
Ramanand Venkata, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1082 days.

(21) Appl. No.: 10/609,091

(22) Filed: Jun. 27, 2003

(51) Int. Cl.
*H04B 1/10* (2006.01)
(52) U.S. Cl. .................. 375/349; 375/354; 326/37; 711/201
(58) Field of Classification Search .............. 375/354, 375/349; 711/201; 326/37
See application file for complete search history.

(56) References Cited

U.S. PATENT DOCUMENTS 6,750,675 B2 * 6/2004 Venkata et al. ............... 326/41
6,854,044 B1 * 2/2005 Venkata et al. ............. 711/201

2002/0190751 A1 12/2002 Lee et al. ..................... 326/39

OTHER PUBLICATIONS

U.S. Appl. No. 10/273,899, filed Oct. 16, 2002, Venkata et al.
U.S. Appl. No. 10/317,262, filed Dec. 10, 2002, Venkata et al.

\* cited by examiner

*Primary Examiner*—Ted Wang
(74) *Attorney, Agent, or Firm*—Ropes & Gray LLP; Robert R. Jackson

(57) ABSTRACT

Circuitry for locating the boundaries of bytes in a data stream is provided. The data stream typically has comma or header information that provides an indication of the byte boundaries. When circuitry detects this information, it can align the byte boundaries and thereby provide byte-aligned data to utilization circuitry (e.g., a programmable logic device). In accordance with this invention, circuitry can select different special characters for use in detecting the byte boundaries, where the special characters are different lengths. Circuitry aligns the byte boundaries based on the selected special character when enabled by a control signal. Once aligned, circuitry can provide a signal indicating which special character was used to align the boundaries. Another advantage of the invention is that it eliminates alignment problems associated with system latency. Circuitry automatically locks alignment to a first instance of a detected special character independent of an external control signal.

25 Claims, 10 Drawing Sheets

DYNAMIC SPECIAL CHARACTER SELECTION FOR USE IN BYTE ALIGNMENT CIRCUITRY

BACKGROUND OF THE INVENTION

This invention relates to data communication, and more particularly to circuitry for receiving data signals that have been communicated from a data signal source.

Data is frequently transmitted serially. Typically the data represents bytes of information that are being transmitted one after another. The usual definition of a byte is eight bits, but as used herein "byte" can refer to any plural number of bits such as eight bits, nine bits, ten bits, 11 bits, or fewer or more than these numbers of bits. When the data is received, one task that the receiving circuitry must typically perform is to find the boundaries between the successive bytes in the received serial bit stream. This may be referred to as "byte alignment" or "byte synchronization".

To facilitate byte alignment, it is typical to transmit special bytes at the start of a packet of bytes of data. The special bytes are sometimes referred to herein as a comma or header information. The receiver circuitry looks for the special byte pattern in the incoming data by comparing the received data to a special character, which can be, for example, stored within the receiver circuitry. When the received data matches the special character, the receiver circuitry knows where the boundaries between subsequent bytes are. This makes it possible for the receiver circuitry to properly handle the subsequent bytes of data.

Several problems can occur once byte boundaries are properly aligned. One problem is that false alignment of byte boundaries can occur when data having the same bytes as the special character is detected by the receiver circuitry, even though this data is not intended to be a special byte. The receiver circuitry may realign the byte boundaries when the "special byte data" is detected. This realignment is undesirable because the newly aligned byte boundaries may not correspond to the correct byte boundaries.

Another problem is that the special character is of fixed length (e.g., 16 bits). Such a special character may only be suitable for certain implementations. For example, a receiver may be coupled to a programmable logic device that requires a different length special character (e.g., 32 bits). Moreover, if the special character is fixed to a particular length, it is possible that received data can mimic the special character and cause improper alignment.

Further still, another problem can be caused by latency in signal propagation. Particularly, when a special character is detected, it may take too long for a (special character detect) signal to propagate to utilization circuitry (e.g., control circuitry), which then provides a signal to instruct the receiver circuitry to cease aligning byte boundaries. This is problematic because during the time it takes for receiver circuitry to cease alignment, an erroneous subsequent special character may be detected, and the byte boundaries may be aligned to the subsequent special character instead of the byte boundaries of the first special character. Had it not been for the latency, the byte boundaries of the first special character would have been used instead of the potentially erroneous byte boundaries accompanying the subsequent special character.

SUMMARY OF THE INVENTION

Byte alignment circuitry in accordance with this invention typically includes a data input, a special character selection input, a control input, a data output, and a status output indicating which special character was (i.e., the byte boundaries set using this special character) used to align the byte boundaries. The special character selection input is used to select a particular special character that can be used to detect and align the byte boundaries. Depending on the special character selection input, a special character of a first length (e.g., 16 bits) or a second length (e.g., 32 bits) may be selected for special character detection. In an alternative embodiment, the special character selection input may select a special character of at least two different lengths (e.g., a 16 bit, 32 bit, or 64 bit special character).

The control input may be provided to enable the byte alignment circuitry to align the byte boundaries to a detected special character.

One advantage of this invention is that it provides dynamic selection between two different special characters for detection and alignment. That is, a first special character may be selected for detection and alignment. Then, if desired, a second special character may be selected for detection and alignment. Alternatively, the second special character may be selected first for detection and alignment, and then the first special character may be selected. Moreover, selection between the first and second special characters may occur as often times as desired.

In addition, the special character can be selected to detect occurrences of the special character in the received data without actually aligning byte boundaries. For example, assuming that the byte boundaries have been aligned, and the selected special character is being detected in byte boundaries in a location contrary to the currently aligned byte boundaries, this may prompt the byte alignment circuitry to realign the byte boundaries.

This invention eliminates latency problems associated with aligning the byte boundaries when a special character is detected. When the special character is detected, the byte alignment circuitry may automatically disable the control input to prevent the byte alignment circuitry from aligning to a subsequently detected special character. Latency problems are avoided by having the byte alignment circuitry internally disable the control input, regardless of the signal being applied to the control input. Thus, the byte alignment circuitry does not have to wait until an externally applied control signal instructs the byte alignment circuitry to cease alignment.

Another advantage of the invention is that the byte alignment circuitry outputs the detected special character to utilization circuitry (e.g., programmable logic device). This allows the utilization circuitry to verify that the correct sequence of special bytes were detected and that the byte boundaries are properly aligned.

Further features of the invention, its nature and various advantages will be more apparent from the accompanying drawings and the following detailed description.

DETAILED DESCRIPTION

Figure 1:
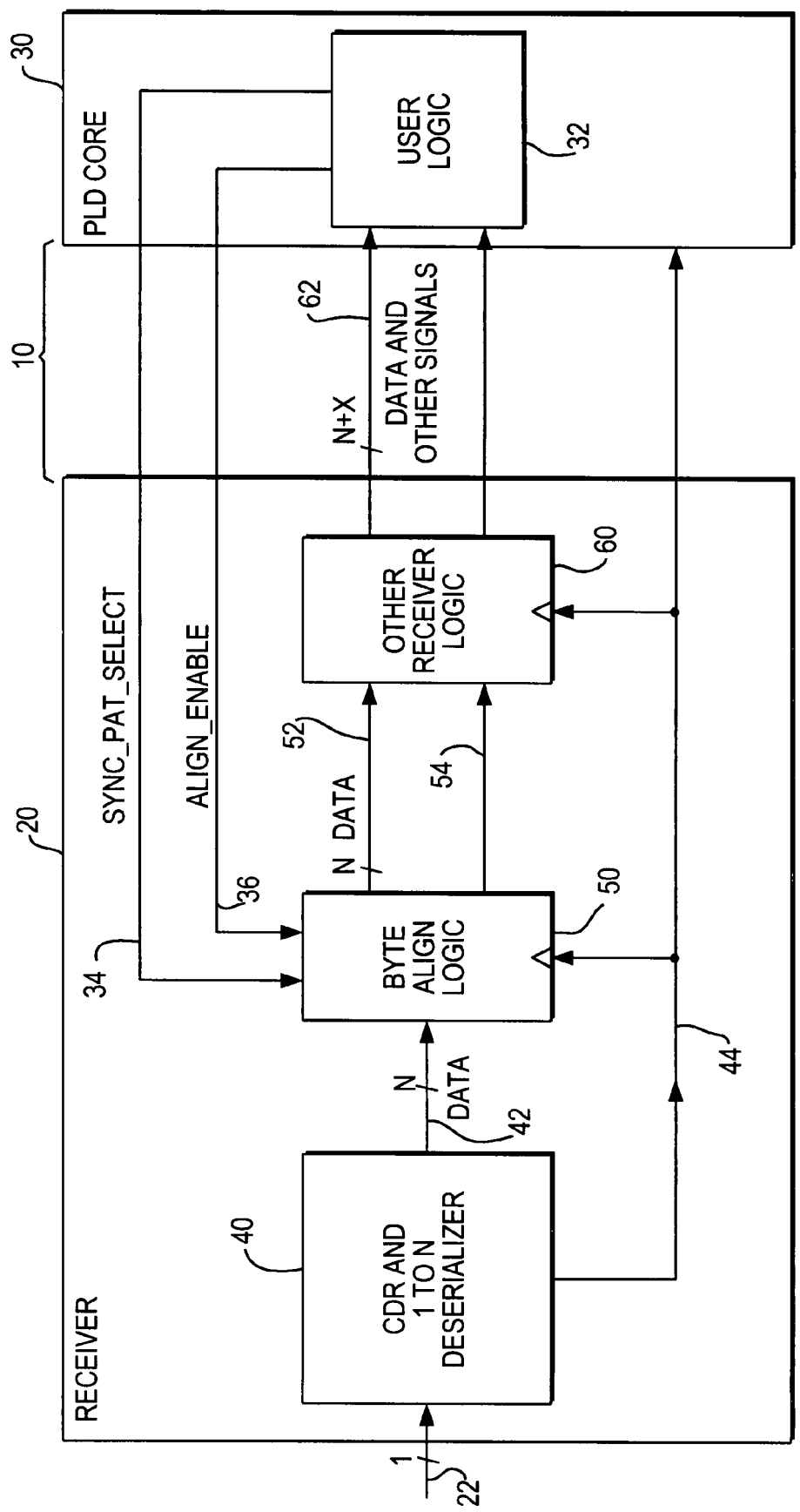
FIG. 1 is a simplified schematic block diagram of an illustrative embodiment of circuitry in accordance with the invention.

The illustrative embodiment shown in FIG. 1 is in the context of programmable logic device ("PLD") circuitry 10 that includes receiver circuitry 20 and PLD core circuitry 30. PLD 10 is typically (although not necessarily) a single integrated circuit. (Alternatively, circuitry 10 could be, for example, a multi-chip module including two or more separate integrated circuits.) The illustrative context shown in FIG. 1 is by no means the only possible context. For example, instead of being used with PLD circuitry (like 30), receiver circuitry 20 could instead be used with many other types of utilization circuitry such as microprocessor circuitry. Many other possible contexts for the invention will occur to those skilled in the art having the benefit of the disclosure contained in this specification. The following description (e.g., of FIG. 1, etc.) will therefore be understood to be illustrative and not limiting.

Receiver 20 receives a serial bit stream signal via lead 22. This signal is applied to clock data recovery ("CDR") and 1 to N deserializer circuitry 40 in receiver circuitry 20. Use of CDR-type signaling (in which data information and clock information are combined in one signal) is optional. Other types of serial data signaling can be used instead, if desired. Even deserialization is optional. The down-stream circuitry could continue to work with serial data in which the byte boundaries have been determined in accordance with this invention. But assuming that circuitry-40-types of signal processing are employed, more information about illustrative suitable circuitry and components for doing these types of signal processing can be found in such references as Aung et al. U.S. patent application Ser. No. 09/805,843, filed Mar. 13, 2001, Lee et al. U.S. patent application Ser. No. 10/093, 785, filed Mar. 6, 2002, Venkata et al. U.S. patent application Ser. No. 10/195,229, filed Jul. 11, 2002, and Venkata et al. U.S. patent application Ser. No. 10/273,899, filed Oct. 16, 2002. It is not believed that the material in these references is essential for understanding and/or practicing any aspect of the present invention. But if additional information is desired or needed for any purpose, it is available from one or more of these references.

CDR circuitry 40 recovers from the incoming serial data a recovered clock signal and a recovered (or retimed) serial data signal. The deserializer portion of circuitry 40 converts the recovered (or retimed) serial data signal to a plurality N of parallel data signals on leads 42. N is typically the number of bits in a byte, but this is not absolutely necessary; and in any event, the N signals on leads 42 are not necessarily aligned with byte boundaries in the incoming data. Circuitry 40 also outputs a clock signal on lead 44 that is typically derived from the recovered clock signal and synchronized with the data on leads 42. For example, assuming that the number of leads 42 is equal to the number of bits in a byte, the clock signal on lead 44 typically has frequency equal to the byte rate of the system. That is, the frequency is equal to the clock associated with the serial data received by the CDR circuitry 40 divided by the number of bits in the byte. The signal on lead 44 may therefore be referred to as a "byte rate clock" or a "slow speed parallel clock."

The signals on leads 42 are applied to byte alignment logic circuitry 50. This circuitry also receives (1) the clock signal on lead 44, (2) a SYNC_PAT_SELECT signal on lead 34 from user logic circuitry 32 in PLD core 30, and (3) an ALIGN_ENABLE signal on lead 36 from user logic circuitry 32. The SYNC_PAT_SELECT signal selects which size special character (e.g., SYNC_PAT A1A2 or SYNC_PAT A1A1A2A2, see discussion below) is used for detecting the selected special character and aligning the byte boundaries.

When the ALIGN_ENABLE signal (sometimes referred to elsewhere herein as the "control signal") is asserted, circuitry 50 is enabled to align the byte boundaries when the special character ("SYNC_PAT") selected by SYNC_PAT_SELECT is detected in the data received via leads 42. Note that circuitry 50 can independently cease alignment to SYNC_PAT regardless of the signal being applied on lead 36. This feature advantageously prevents misalignment to subsequent detection of special characters, where the subsequent special characters are data, not header or comma information. Also note that in some embodiments the ALIGN_ENABLE signal may activate or deactivate a portion of circuitry 50 responsible for aligning the byte boundaries. It is further noted that the portion of circuitry 50 responsible for searching the received data for a special character may remain active, regardless of the ALIGN_ENABLE signal.

The SYNC_PAT used for comma detection and alignment is "constructed" from two bytes. Each byte, herein referred to as "A1" and "A2," is stored in a register. The bytes "A1" and "A2" may be stored in separate registers or in one register. Depending on the SYNC_PAT_SELECT signal, various combinations of the register contents are used to construct a special character. For example, SYNC_PAT_SELECT may select SYNC_PAT A1A2, in which case circuitry 50 needs to detect A1 and A2 in successive byte-rate clock cycles to align the byte boundaries. In another example, SYNC_PAT_SELECT may select SYNC_PAT A1A1A2A2, in which case circuitry 50 needs to detect the byte A1 in two sequential clock cycles and the byte A2 in two sequential clock cycles that immediately follow the second A1 byte. It is understood that the SYNC_PAT_SELECT signal can select a SYNC_PAT special character of several different lengths. That is, the SYNC_PAT can be any combination of N(A1)N(A2), where n is greater than zero. For example, when n is 1, the SYNC_PAT is A1A2. When n is 3, the SYNC_PAT is A1A1A1A2A2A2.

Several different circuitry implementations can be used to detect the SYNC_PAT. For example, circuitry 50 may be constructed to always contain the two most recent successive outputs of circuitry 40 in parallel, and to look for occurrences of bytes (e.g., A1 or A2) of SYNC_PAT in any of the N different groups of N adjacent bits in that data during each cycle of the clock signal on lead 44. (This example assumes that N is equal to the number of bits in a byte.) In another example, circuitry 50 may be constructed to contain the most recent output of circuitry 40 in parallel, and phase shift the parallel bits until the leading byte boundary is aligned with the first parallel bit and the ending byte boundary is aligned with the last parallel bit. This is sometimes referred to as bitslipping. Circuitry 50 can shift the parallel bits by delaying the byte rate clock signal. For example, if the byte rate clock cycle is delayed one clock cycle, the serial data stream that is stored in parallel is shifted by one adjacent bit. This shifting or phase delay is continued until the byte boundaries are properly aligned in parallel. Moreover, shifting can be user controlled or automatically controlled.

Circuitry 50 may include state machine circuitry that requires SYNC_PAT to be found in the same place in the data a predetermined number of times within a predetermined time interval (e.g., a predetermined number of cycles of the clock signal on lead 44). As an alternative to including such state machine circuitry in circuitry 50, it may be included in user logic 32, which would facilitate making it programmable (although even when included in circuitry 50, certain aspects of the state machine (such as various parameter values) may be programmable).

When the predetermined criteria for adequate detection of SYNC_PAT are satisfied, circuitry 50 outputs the aligned bytes of data on N leads 52. Circuitry 50 may provide a SIZE_STATUS signal on lead 54 to circuitry 60. SIZE_STATUS signal indicates which selected SYNC_PAT was used to detect and align the byte boundaries. Circuitry 50 may also provide a PATTERN_DETECT signal (not shown) which allows other circuitry 60 in receiver 20 to begin to further process the byte-aligned data on leads 52 and to pass that data on to PLD core 30 (especially user logic circuitry 32) via leads 62. Circuitry 50 may also provide a RESYNC signal (not shown) to circuitry 60. A RESYNC signal may provide an indication that byte alignment needs to be realigned (because SYNC_PAT is being detected at byte boundaries contrary to the current alignment). Leads 62 may pass the aligned data and any other signals (indicated by "X" in the FIG.) such as SIZE_STATUS, PATTERN_DETECT, and RESYNC to PLD core 30.

Circuitry 60 may perform various conventional or previously disclosed operations on the byte-aligned data in preparation for passing that data on to user logic 32. Such operations may include any or all of eight-bit-to-ten-bit decoding, decryption, clock rate matching, phase compensation, channel deskew, and/or the like. The several references mentioned earlier in this specification provide more information about several types of operations that may be performed by circuitry 60. On the other hand, the presence of circuitry 60 is entirely optional, and it can be completely omitted if desired. If circuitry 60 is omitted, the outputs of circuitry 50 may be applied directly or substantially directly to user logic 32.

Figure 2:
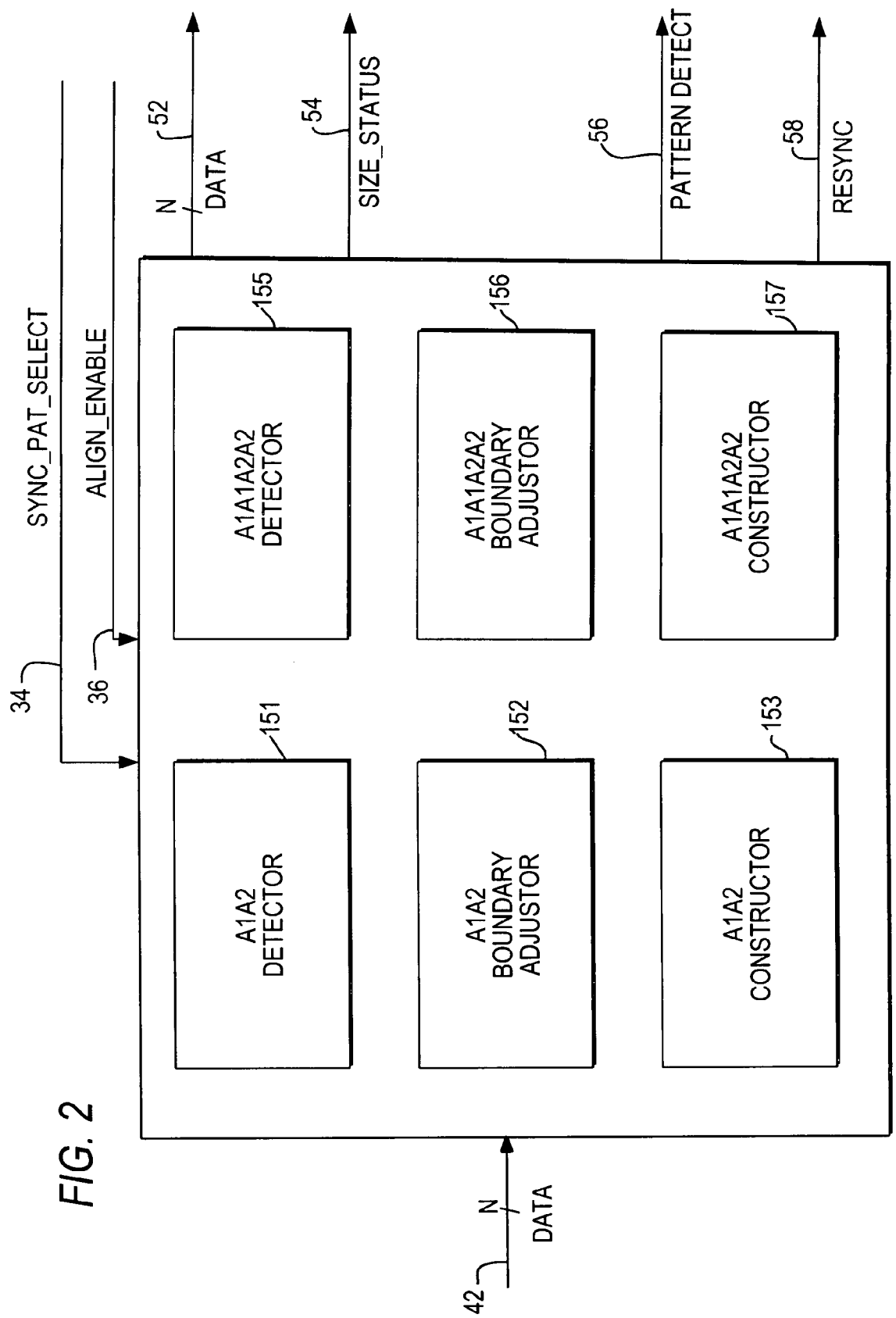
FIG. 2 is a more detailed, but still simplified, schematic block diagram of an illustrative embodiment of a portion of the circuitry of FIG. 1 in accordance with the invention.

FIG. 2 is a more detailed, but still simplified block diagram of byte alignment circuitry 50 of FIG. 1 in accordance with the invention. As shown in FIG. 2, circuitry 50 receives deserialized data on leads 42 from circuitry 40 (not shown). Circuitry 50 also receives the SYNC_PAT_SELECT signal on lead 34 and the ALIGN_ENABLE signal on lead 36, both signals of which may be provided by user logic 32. The combination of the SYNC_PAT_SELECT and ALIGN_ENABLE signals may be needed to instruct circuitry 50 to detect the SYNC_PAT and align the byte boundaries. For example, when user logic 32 desires to align the byte boundaries, it can enable the ALIGN_ENABLE signal and select which SYNC_PAT_SELECT circuitry 50 should use by providing the requisite signal on lead 34.

For example, if the SYNC_PAT_SELECT signal selects SYNC_PAT A1A1A2A2 and ALIGN_ENABLE is enabled, circuitry 50 may activate the A1A1A2A2 portion of the circuitry to align the byte boundaries. Particularly, circuitry 50 may use detector circuitry 155 to detect SYNC_PAT A1A1A2A2. When the special character is found, circuitry 50 may use boundary circuitry 156 to set the byte boundaries for which properly aligned bytes are obtained and then transmitted on leads 52.

Detector circuitry 155 may operate in conjunction with boundary adjustor circuitry 156 to detect the special pattern and align the byte boundaries. For example, detector circuitry 155 or boundary adjustor circuitry 156 or both may include state machine circuitry. When a special character is detected and state machine criteria are met, boundary adjustor circuitry 156 can align the byte boundaries accordingly.

Constructor circuitry 157 ensures that the special character is provided to user logic 32 when proper alignment has been obtained. This is to enable user logic 32 to verify that the correct byte boundaries have been established.

Had user logic 32 selected a different SYNC_PAT (e.g., SYNC_PAT A1A2) than that selected in the foregoing example (in which SYNC_PAT A1A1A2A2 was selected), circuitry 50 may implement circuitry (e.g., detector circuitry 151, boundary adjustor circuitry 152, and constructor circuitry 153) associated with SYNC_PAT A1A2. The operation of detector circuitry 151, boundary adjustor circuitry 152, and constructor circuitry 153 is essential the same as the aforementioned detector circuitry 155, boundary adjustor circuitry 156, and constructor circuitry 157. It is understood that detector circuitry 151 and 155, boundary adjustor circuitry 152 and 156, and constructor circuitry 153 and 157 do not necessarily represent separate and distinct sets of circuitry. Both sets of circuitry may be illustrated to show that circuitry 50 is capable of using one or more special characters of different size (e.g., A1A2 or A1A1A2A2) to implement byte alignment. If desired, one such set of circuitry can be implemented in circuitry 50. Alternatively, two separate sets of circuitry (as illustrated in FIG. 2) may be implemented in circuitry 50.

Circuitry 50 may provide the signals SIZE_STATUS on lead 54, PATTERN_DETECT on lead 56, and RESYNC on lead 58. As previously stated, the SIZE_STATUS signal indicates which SYNC_PAT (e.g., A1A2 or A1A1A2A2) was used to align the byte boundaries. User logic 32 may use this signal to determine whether a different size special character should be implemented, or to confirm that the requisite special character was used to align the byte boundary.

For example, assuming that the byte boundary was last aligned with SYNC_PAT A1A2, the SIZE_STATUS signal would indicate that the byte boundary was aligned with the A1A2 special character. Further assume that the other SYNC_PAT that can be selected is A1A1A2A2. If user logic 32 provides the requisite signals to align the byte boundaries using the A1A1A2A2 special character, the SIZE_STATUS signal may continue to provide the A1A2 size status until the byte boundaries are aligned to the A1A1A2A2 special character. Once the byte boundaries are aligned, the SIZE_SIGNAL status may change from the A1A2 size status to A1A1A2A2 size status.

One advantage of the invention is a self-locking alignment feature that avoids potential issues related to delays in signal propagation and system latency. More particularly, when circuitry 50 detects and aligns the byte boundaries, it automatically prevents a subsequent realignment to another special character that is detected. Circuitry 50 may accomplish this by internally disregarding the ALIGN_ENABLE signal being transmitted on lead 36 or by disabling the boundary adjustor circuitry. Circuitry 50 may internally disregard ALIGN_ENABLE because user logic 32 may not disable the signal (e.g., ALIGN_ENABLE) in time to prevent another realignment (due to for example, system latency). Although the PATTERN_DETECT signal provides an indication that the byte boundary has been aligned, this signal may have to pass through several pipeline stages before it can be processed by user logic 32. Hence, user logic 32 may be delayed in disabling the ALIGN_ENABLE signal.

Circuitry 50 may be reactivated to realign the byte boundaries under a number of different conditions. Circuitry 50 may be responsive to the ALIGN_ENABLE signal when it is reasserted by user logic 32. For example, assume that circuitry 50 has aligned the byte boundaries and has internally disabled the boundary adjustor circuitry. The ALIGN_ENABLE signal is deasserted when user logic 32 receives the PATTERN_DETECT signal. Deassertion of this signal may "reset" circuitry 50 by enabling it to respond to an enabling ALIGN_ENABLE signal. Thereafter, circuitry 50 may then detect the special character and align the byte boundaries when the appropriate signals are provided on leads 34 and 36.

A RESYNC signal may be transmitted by circuitry 50 when the special character is detected in byte boundaries different than the currently aligned byte boundaries. A RESYNC signal may indicate that the byte boundaries need to be realigned. Again, state machine circuitry in circuitry 50 (or user logic 32) may be used to establish additional criteria (such as a certain amount of sufficiently frequent repetition) that must be satisfied before a RESYNC signal is output. The RESYNC signal is passed on to user logic 32 along with the data and PATTERN_DETECT signals. Statements made earlier about various state machine options apply equally to any state machine functions mentioned in this paragraph.

There are various ways that the RESYNC and PATTERN_DETECT signals described above can be used, preferably by user logic 32. For example, the RESYNC signal can be monitored for occurrences of SYNC_PAT selected by the SYNC_PAT_SELECT signal. If other available information or conditions make it clear that RESYNC has been asserted falsely (e.g., because a pattern resembling SYNC_PAT has occurred across still properly aligned byte boundaries), the RESYNC signal can be ignored.

Ignoring RESYNC means not asserting ALIGN_ENABLE, thereby preventing circuitry 50 from changing its already established byte alignment. Alternatively, if it appears that an assertion of RESYNC may truly indicate a need for a new byte alignment, user logic 32 can assert ALIGN_ENABLE in response to the RESYNC signal, thereby enabling circuitry 50 to search for and establish a new byte alignment. Assertion of PATTERN_DETECT is preferably suspended when ALIGN_ENABLE is asserted and until circuitry 50 again determines that it has found a byte alignment. The same is true for the output of byte-aligned data via leads 52. The operations concerning the RESYNC signal is not intended to be an exhaustive description of the various ways the RESYNC signal is used. U.S. patent application Ser. No. 10/317,262, filed Dec. 10, 2002, for example, provides a substantial description of operations involving the RESYNC signal.

Figure 3:
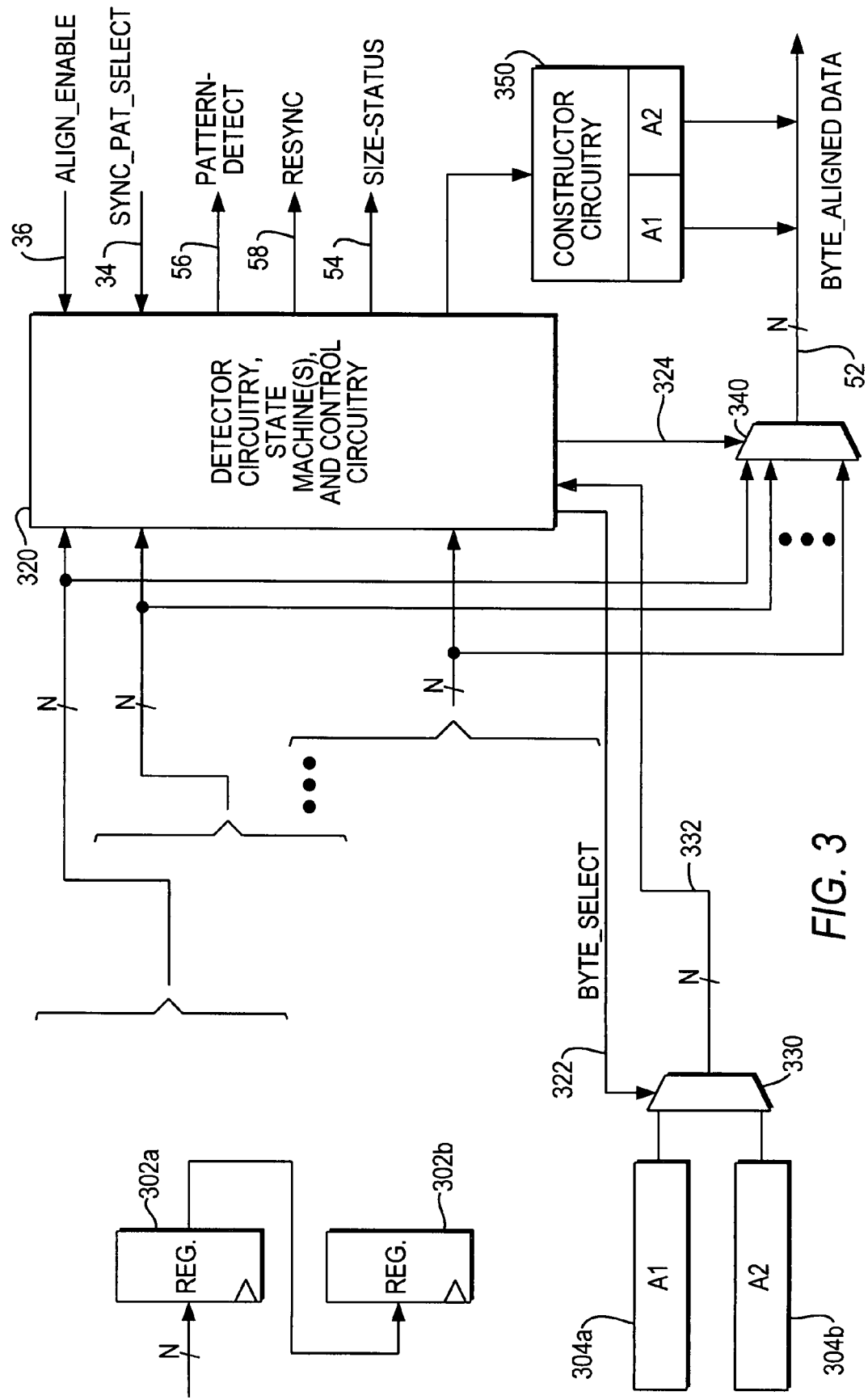
FIG. 3 is a more detailed, but still simplified, schematic diagram of an illustrative embodiment of byte alignment circuitry of FIGS. 1 and 2 in accordance with the invention.

An illustrative embodiment of byte alignment circuitry 50 is shown in more detail in FIG. 3. Register 302*a* stores the most recent N bits of data received via leads 42 (FIG. 1). Register 302*b* stores the next-most-recent N bits of data received via leads 42. Registers 302*a* and 302*b* are typically clocked by byte rate clock 44 (FIG. 1). Register 304*a* stores SYNC_PAT A1 and register 304*b* stores SYNC_PAT A2. Note that a single register can be used to store SYNC_PAT A1A2, but two registers are illustrated in the FIG. to better complement the description of the invention.

Circuitry 320 can include detector circuitry (to search for the selected special character), state machine(s) (to determine if the selected special character is being detected), and control circuitry. Circuitry 320 compares N different groups of N adjacent bits from registers 302*a*/302*b* to one of the bytes comprising SYNC_PAT and produces an output signal if and only if there is a match. The particular SYNC_PAT byte that is compared to the register contents is selected by BYTE_SELECT signal 322 (provided by the control circuitry of circuitry 320), which causes multiplexor 330 to output the contents of either register 304*a* or 304*b* to circuitry 320 on leads 332.

To further illustrate how circuitry 320 searches for the selected special character, consider the following example. Assume that in each of registers 302*a* and 302*b* the serially most recent of the stored bits is at the top, and the bits become serially older toward the bottom of each register. (These references to serial age relate to the order in which the bits were received via lead 22 (FIG. 1).) During a first byte-rate clock cycle, circuitry 320 compares N bits from register 302*a* to the selected byte of SYNC_PAT (e.g., A1). Circuitry 320 also compares N−1 bits from register 302*a* (i.e., all but the serially most recent bit in register 302*a*) and one bit from register 302*b* (i.e., the serially most recent bit in register 302*b*) with the selected byte of SYNC_PAT (e.g., A1). This pattern progresses so that it concludes with circuitry 320 comparing one bit from register 302*a* (i.e., the serially oldest bit in register 302*a*) and N−1 bits from register 302*b* (i.e., all but the serially oldest bit in register 302*b*) with the selected byte of SYNC_PAT. In this way the selected byte of SYNC_PAT can be found anywhere that it may occur in the incoming data, without regard for whether circuitry 40 (FIG. 1) happens to be outputting byte-aligned data. When a byte of the special character is detected, that particular comparison produces an output. However, detection of one byte of the SYNC_PAT does not necessarily suggest that the special character has been detected. Each byte of the SYNC_PAT has to be detected in sequence in order to affirm detection of the special character.

Then, during a second byte-rate clock cycle, circuitry may perform the same aforementioned comparisons, but using the other byte that comprises SYNC_PAT (e.g., A2). Note that the particular SYNC_PAT byte selected for comparison by circuitry 320 depends on which special character is selected by the SYNC_PAT_SELECT signal on lead 34.

The results of each comparison performed by circuitry 320 can be provided to state machine(s). The state machine(s) can use this information to determine if a special character is detected in a particular byte boundary. For example, assume that that the ALIGN_ENABLE signal is being asserted on lead 32, and the SYNC_PAT_SELECT signal selects the special character to be "A1A2." In order to align the byte boundaries, the state machine(s) determine if the bytes comprising SYNC_PAT have been detected in the correct sequence and in the same byte boundaries. If the state machine(s) verifies that the byte A1 is detected and followed immediately thereafter (e.g., in the next byte-rate clock cycle) by the byte A2, where both A1 and A2 are detected in the same byte boundaries, the special character is detected. When the special character is detected and verified, circuitry aligns the byte boundaries by providing a signal on lead 324 to multiplexor 340 to select which group of N bits stored in registers 302*a*/302*b* are output on leads 52. The signal on lead 324 selects the group of N bits that correspond to the aligned byte boundaries. Thereafter, the selected input of multiplexor 340 provides byte aligned data on leads 52.

After the circuitry 320 detects the byte boundaries, it instructs constructor circuitry 350 to inject the necessary SYNC_PAT bytes on leads 52 to ensure that user logic 32 receives the selected special character. In order to provide user logic 32 with special character, constructor circuitry 350 injects all but the last byte of the special character onto leads 52 before circuitry 320 selects which multiplexor input is provided on leads 52. All SYNC_PAT bytes but the last byte of the special character are injected because the last byte will be transmitted to user logic 32 from registers 302a/302b. For example, if a "A1A1A2A2" special character is detected, constructor circuitry may inject "A1A1A2" onto leads 52. Thus, when circuitry 320 selects which multiplexor input (e.g., the byte aligned group of N bits) is provided on leads 52, the last SYNC_PAT byte (e.g., A2) will be provided to user logic 32.

Although FIG. 3 suggests that circuitry 320 is all part of circuitry 50, it will be understood that parts or all of circuitry 320 can be implemented elsewhere, such as in user logic 32 (FIG. 1).

Figure 4:
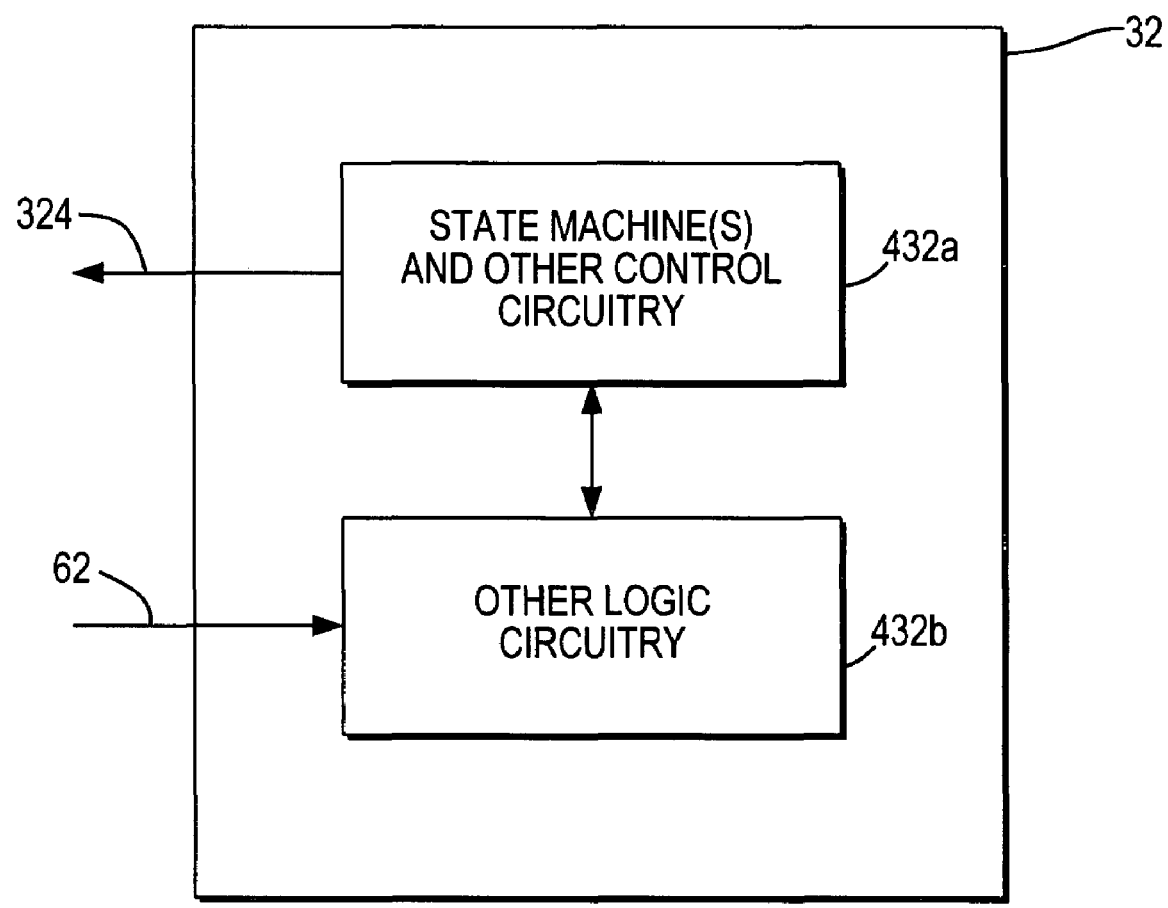
FIG. 4 is simplified schematic block diagram of an illustrative embodiment of user logic circuitry in accordance with the invention.

FIG. 4 shows that user logic 32 (FIG. 1) can include state machine(s) and other control circuitry 432a for supporting the operation of byte alignment circuitry 50 (FIG. 1) and also other user logic circuitry 432b. For example, state machine type functions that are generally described herein as part of circuitry 50 can instead be included in circuitry 432a. More particularly, state machine circuitry for determining when the selected special character is detected can be part of circuitry 432a. How state machine and other control functions are allocated among the various portions of the circuitry is largely a matter of choice for the user.

Figure 5A:
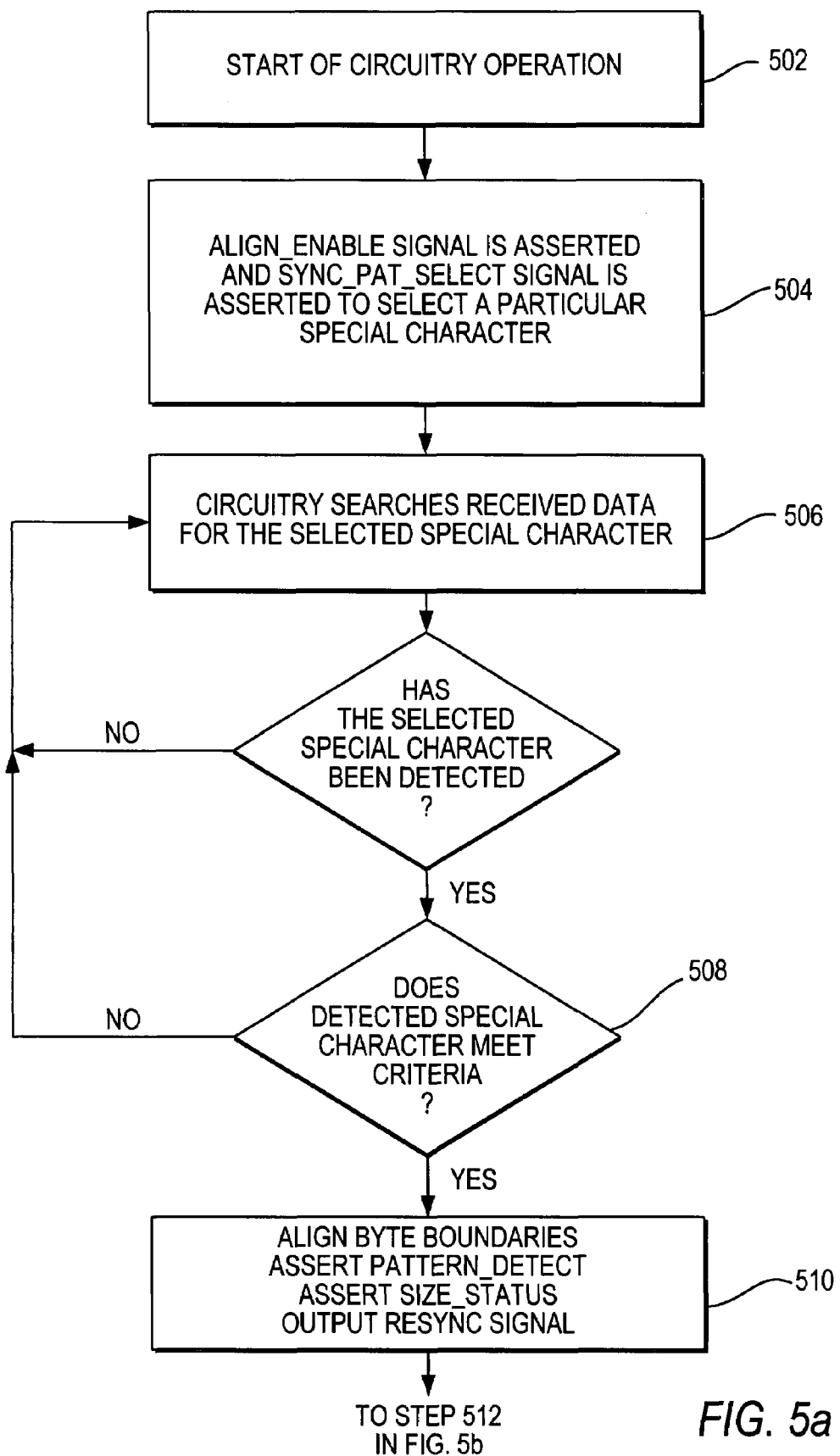
FIGS. 5a and 5b are collectively a simplified flow chart of illustrative modes of operation of circuitry of the type shown in FIGS. 1 and 2 in accordance with the invention.
Figure 5B:
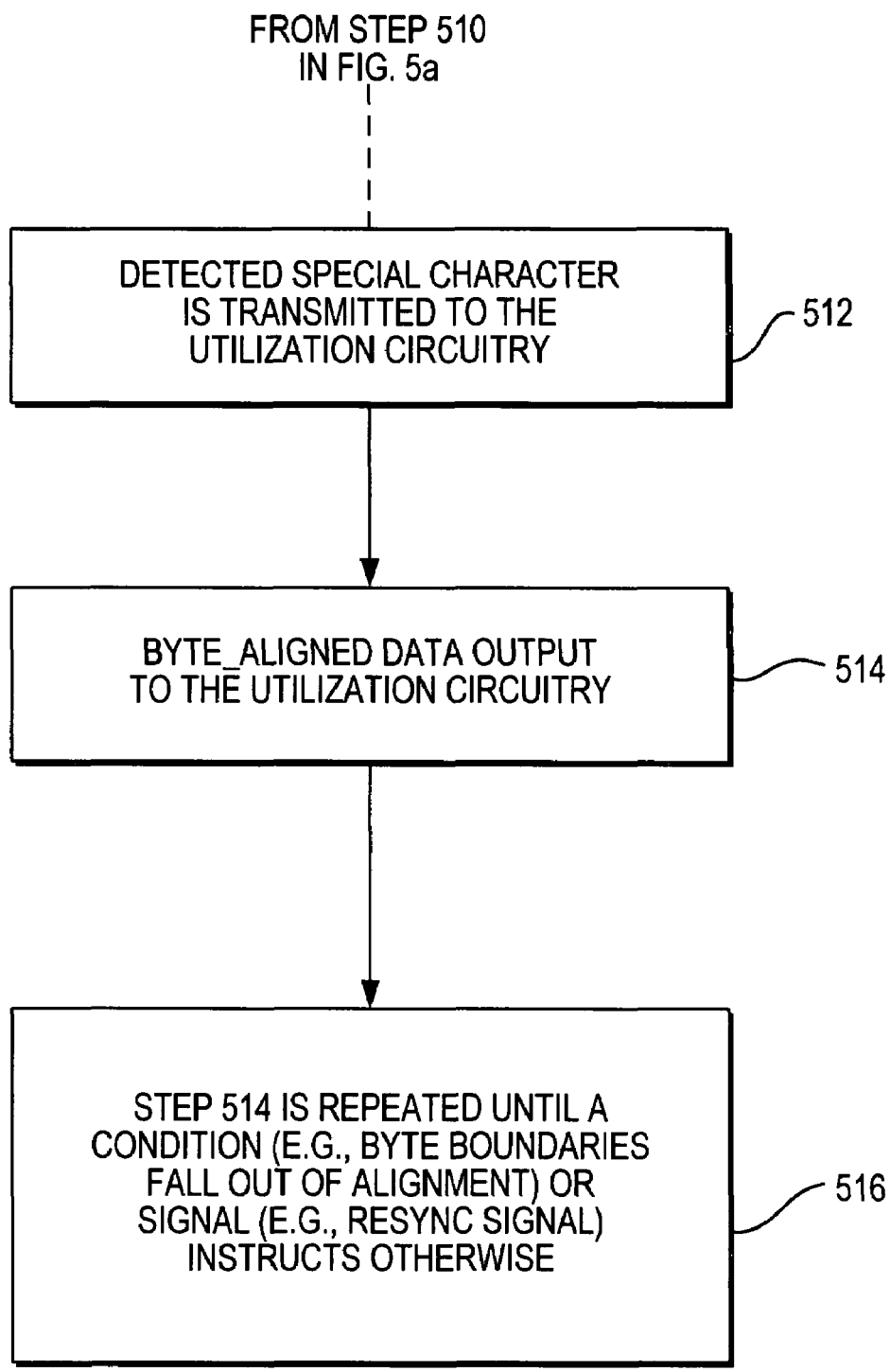

FIGS. 5a and 5b collectively show an illustrative process of operating circuitry in accordance with the invention. The process starts at step 502, which indicates the start of operation of the circuitry (e.g., circuitry is activated). In step 504, the ALIGN_ENABLE signal is asserted to activate byte alignment circuitry 50 (FIG. 1). Also at step 504, a particular SYNC_PAT_SELECT signal is asserted to select which SYNC_PAT (e.g., A1A2 or A1A1A2A2) should be used to detect and align the byte boundaries. Note that a user may deassert the ALIGN_ENABLE signal at any time to prevent circuitry from aligning or re-aligning the byte boundaries.

At step 506, circuitry searches for the selected SYNC_PAT on the data provided on leads 42 (FIG. 2). Step 506 is repeated until the selected SYNC_PAT is detected, which causes the process to proceed to step 508. Step 508 verifies that the detected special character meets certain criteria before aligning the byte boundaries. State machines may be employed to verify that the criteria has been met. If the criteria in step 508 are satisfied, the process proceeds to step 510. If the criteria are not satisfied, the process reverts back to step 506, where the circuitry continues to search for the selected special character.

Figure 7:
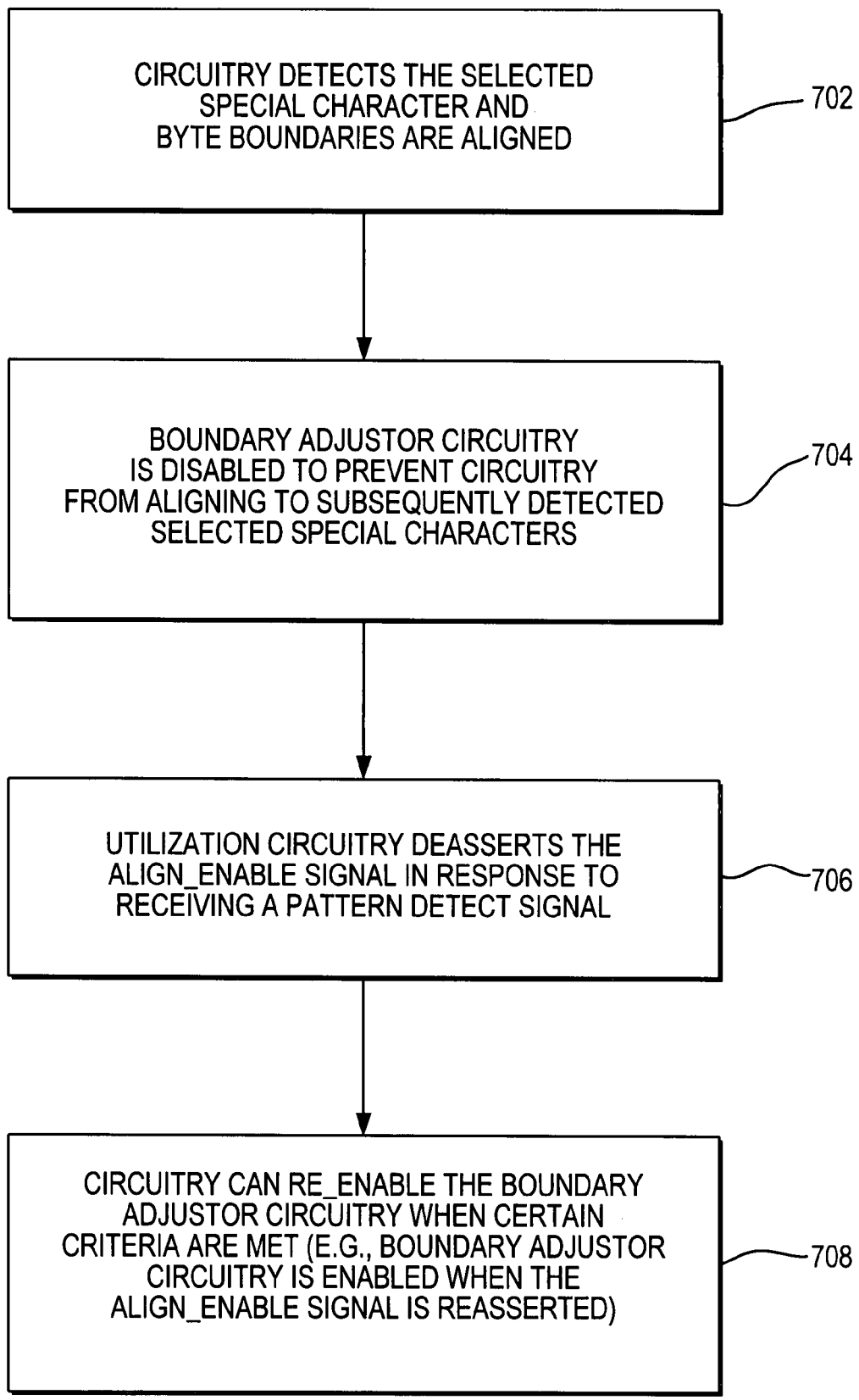
FIG. 7 is a simplified flow chart showing how the byte alignment boundary circuitry can lock onto byte boundaries in accordance with the invention.

At step 510, the byte boundaries are aligned. In addition, the PATTERN_DETECT signal may be asserted to indicate that byte alignment has been established. Also at step 510 a particular SIZE_STATUS signal is output by circuitry 50 to indicate which special character (e.g., A1A2 or A1A1A2A2) was used to detect and align the byte boundary. In addition, a RESYNC signal is output by circuitry 50. Furthermore, circuitry 50 may disregard an asserted ALIGN_ENABLE signal once step 508 has confirmed that the detected pattern satisfies the criteria. This is to prevent circuitry 50 from realigning to a subsequently transmitted special character. A more detailed flowchart illustrating this feature is shown in FIG. 7.

At step 512, the detected special character is transmitted to user logic 32 (with assistance of the constructor circuitry). The special character may be processed by user logic 32 to verify that the special character was correctly detected.

After the detected special character is transmitted, circuitry 50 outputs byte-aligned data at step 514.

At step 516, byte alignment circuitry 50 continues to repeat step 514 until a condition (e.g., predetermined realignment) or signal (e.g., RESYNC signal) instructs it to operate otherwise.

Note that the steps shown in FIG. 5 are merely illustrative and that additional steps may be added or some of the steps may be deleted.

Figure 6A:
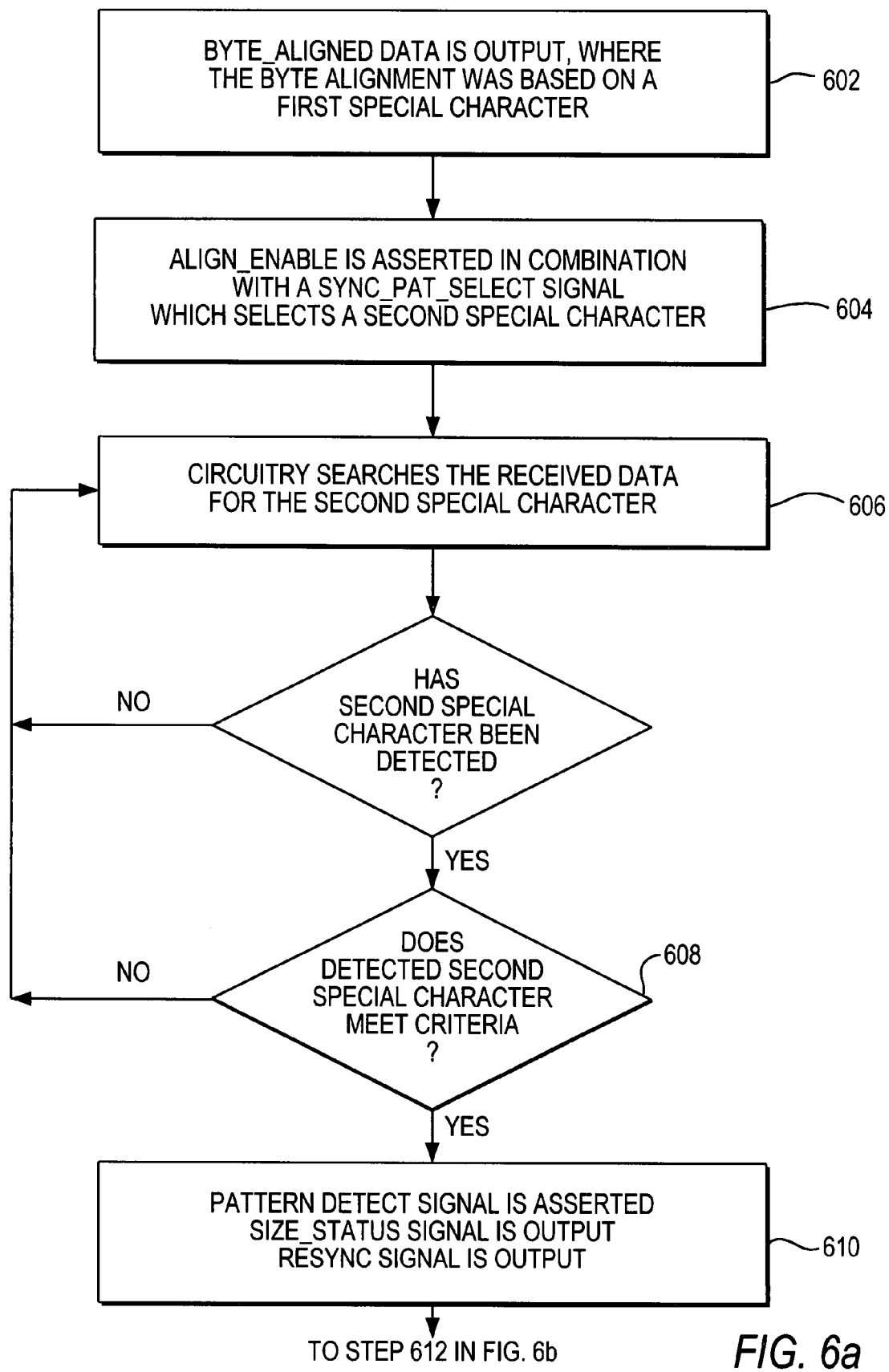
FIGS. 6a and 6b are collectively a simplified flow chart of illustrative dynamic special character selection modes of operation of circuitry of the type shown in FIGS. 1 and 2 in accordance with the invention.
Figure 6B:
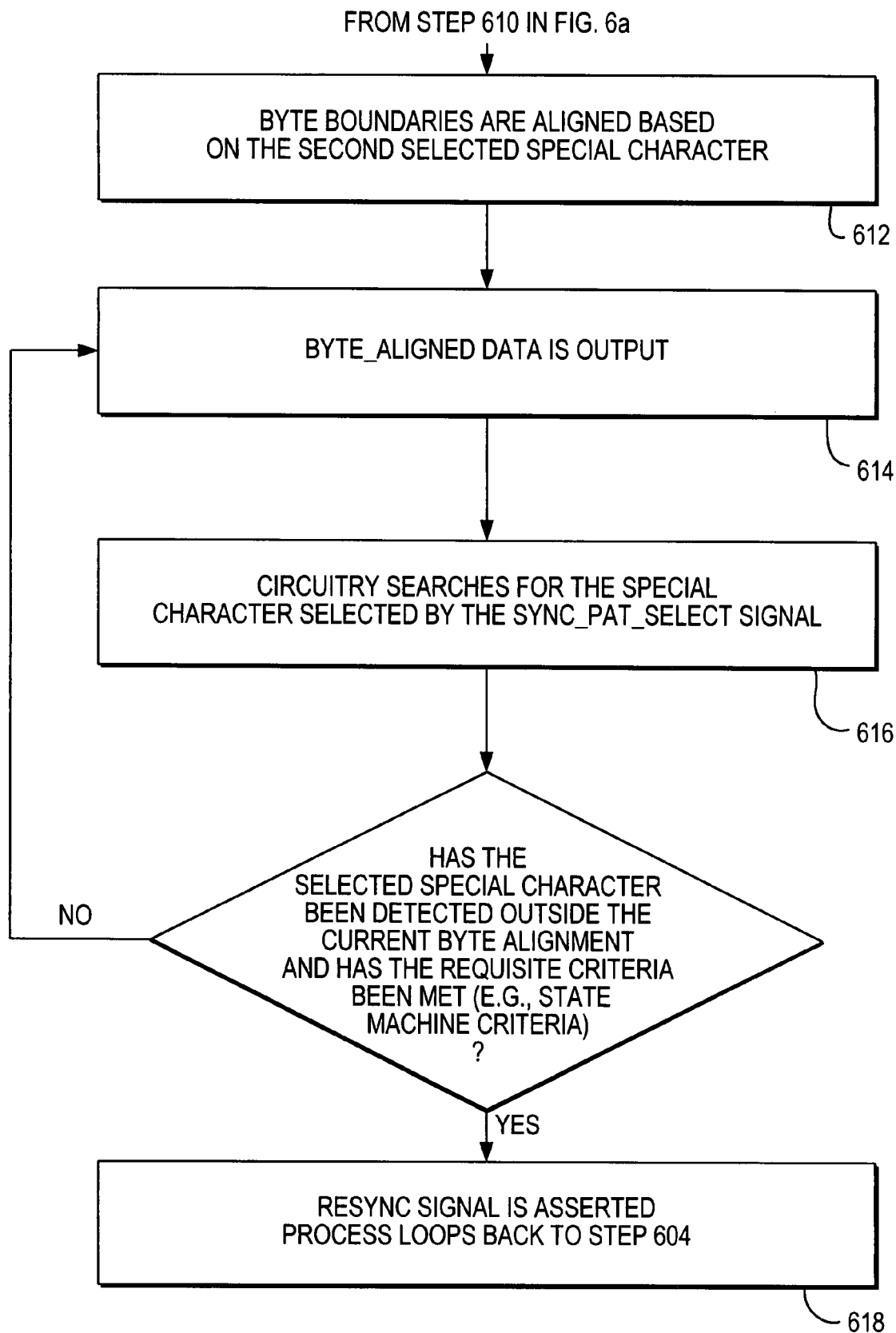

FIGS. 6a and 6b collectively illustrate a process in which a special character is dynamically selected in accordance with the present invention. The process beginning at step 602 has circuitry 50 outputting byte-aligned data, where the byte alignment is based on a first special character (e.g., A1A2).

At step 604, ALIGN_ENABLE is asserted in combination with a SYNC_PAT_SELECT signal that selects a second special character (e.g., A1A1A2A2). When circuitry 50 receives the ALIGN_ENABLE and SYNC_PAT_SELECT signals, it searches the received data (from leads 42) for the second special character, at step 606. The process continues to loop back onto itself while searching for the special character. When the special character is detected, the process moves to step 608. At step 608, which is similar to step 508 of FIG. 5, a determination is made as to whether the detected special character meets certain criteria before byte boundary is aligned.

Note that while step 606 and 608 are searching for and verifying detection of the special character, circuitry 50 may continue to output byte-aligned data. Circuitry 50 may be instructed to realign the byte boundary at any given time, regardless of whether the byte boundary is out of alignment. Transmission of byte-aligned data may be suspended, for example, when the RESYNC signal is asserted.

If the criteria in step 608 is satisfied, the PATTERN_DETECT signal is asserted. The SIZE_STATUS signal is also output by circuitry 50. Other operations as discussed above in connection with step 510 apply to step 610 (such as internal disablement of the boundary adjustor portion of circuitry 50 and disablement of the ALIGN_ENABLE signal).

At step 612, the byte boundaries are aligned, based on the second special character. Thereafter, at step 614, byte-aligned data is output on leads 52. At step 616, circuitry 50 searches for subsequent occurrences of the special character selected by the SYNC_PAT_SELECT signal. If desired, user logic 32 can select a special character different than the special character currently being used. For example, if the byte boundaries were aligned using a first SYNC_PAT (e.g., A1A2 SYNC_PAT), circuitry 50 may be instructed to detect a second SYNC_PAT (e.g., A1A1A2A2) after alignment because the second special character may have a longer special character than the first special character. A longer special character is less likely to appear in the data stream than a shorter special character, thereby reducing potential for misalignment.

Thus the process continues to loop back to step 614 until circuitry 50 (1) detects the selected special character out of alignment and (2) certain criteria have been met. If these two conditions are met, circuitry 50 may assert the RESYNC signal, at step 618.

Once RESYNC is asserted, the process may loop back to step 604. Note that the SYNC_PAT_SELECT signal does not necessarily have to select the second special character, but that any available special character can be selected.

FIG. 7 illustrates a process in which the align-enable functionality of byte alignment circuitry is temporarily disabled in accordance with the invention. This disablement feature advantageously reduces the possibility of false alignment, which can be caused by delays in signal propagation. For example, assume leads 42 provide two patterns of A1A2 separated by a bit, where the first pattern is the comma and the second pattern is data. Further assume that ALIGN_ENABLE is asserted and the SYNC_PAT_SELECT signal selects special character "A1A2." After circuitry 50 detects and aligns to the first instance of the special character, system latency or delays in deasserting ALIGN_ENABLE may enable circuitry to detect and erroneously align to the second instance of the special character. Because circuitry 50 was not able to prevent alignment to the second pattern, data provided on leads 52 are incorrectly aligned. Thus to prevent erroneous alignment, the present invention advantageously disables the boundary adjuster circuitry immediately after detection of the first special character and the corresponding alignment, thereby preventing circuitry 50 from aligning to other detected special characters.

Beginning at step 702, circuitry 50 detects the special character. The detected special character may or may not meet state machine criteria, which may be optional. Once the signal is detected, the byte boundary is aligned and the process may move to step 704. At step 704, the boundary adjustor circuitry is disabled regardless of whether ALIGN_ENABLE is being asserted. Circuitry 50 can still detect subsequent special patterns but it will not align the byte boundaries to the special character until the boundary adjustor circuitry is re-enabled. At step 706 the ALIGN_ENABLE signal is deasserted when the utilization circuitry receives a PATTERN_DETECT signal from control circuitry 50. At step 708, circuitry 50 may re-enable the boundary adjustor circuitry when certain criteria are met. Such criteria can include, for example, a predetermined sequence of ALIGN_ENABLE signals (e.g., a logic LOW signal followed by a logic HIGH signal) or a predetermined period of time (e.g., a predetermined number of clock cycles).

Figure 8:
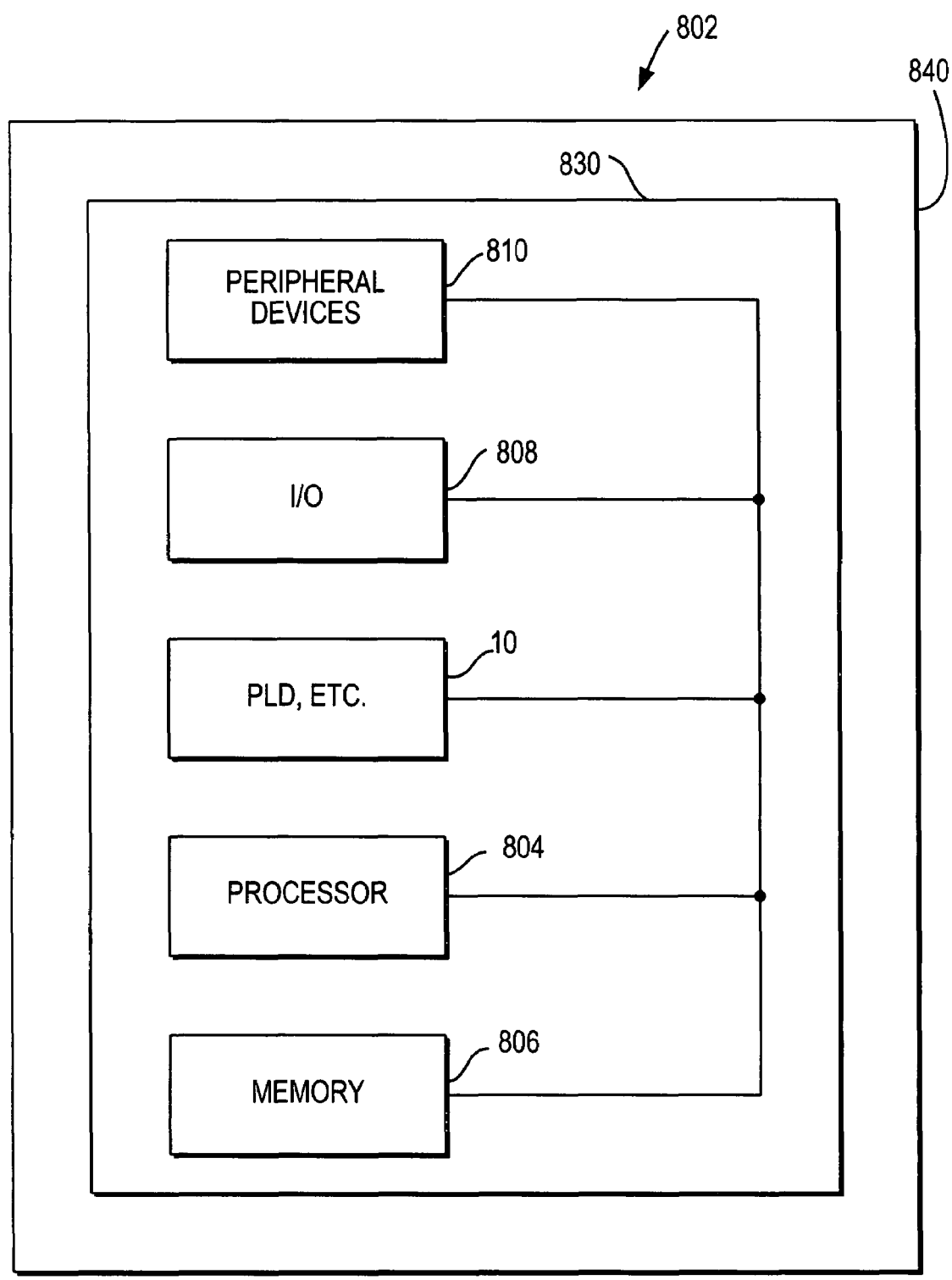
FIG. 8 is a simplified block diagram of an illustrative system employing circuitry in accordance with the invention.

FIG. 8 illustrates possible use of circuitry 10 of the type shown in FIG. 1 in a data processing system 802 in accordance with the invention. Data processing system 802 may include one or more of the following components: a processor 804, a memory 806, I/O circuitry 808, and peripheral devices 810. These components are coupled together by a system bus or other interconnections 820 and are populated on a circuit board 830 (e.g., a printed circuit board) that is contained in an end-user system 840. Communication among the various components shown in FIG. 8 and/or with external circuitry may be of the type described above in connection with FIG. 1 to any desired extent. As an addition or alternative to use of the circuitry 10 of this invention in a more or less stand-alone component 10 in FIG. 8, such circuitry may also or alternatively be provided as communication interface circuitry in any of the other components 804, 806, 808, and 810.

System 802 can be used in a wide variety of applications, such as computer networking, data networking, instrumentation, video processing, digital signal processing, or any other application where the advantage of using programmable or reprogrammable logic is desirable. Circuitry 10 (including programmable logic circuitry 30 as in FIG. 1) can be used to perform a variety of different logic functions. For example, circuitry 10 can be configured as a processor or controller that works in cooperation with processor the determination 804. Circuitry 10 may also be used as an arbiter for arbitrating access to a shared resource in system 802. In yet another example, circuitry 10 can be configured as an interface between processor 804 and one of the other components of system 802. It should be noted that system 802 is only exemplary, and that the true scope and spirit of the invention should be indicated by the following claims.

It will be understood that the foregoing is only illustrative of the principles of the invention and that various modifications can be made by those skilled in the art without departing from the scope and spirit of the invention. For example, the circuitry can be adapted to work with "bytes" of any plural number of bits.

What is claimed is:

1. Byte alignment circuitry comprising:
   a data input;
   a control input;
   a special character selection input indicating which one of a plurality of different special characters is to be used for byte alignment, the plurality of different special characters including special characters having a plurality of different sizes in terms of how many bytes they include;
   a special character status output indicating which one of the plurality of special characters was used to align the byte boundaries; and
   a data output.

2. The circuitry defined in claim 1 wherein said data input is one of a plurality of parallel data inputs.

3. The circuitry defined in claim 2 wherein said plurality of parallel data inputs is the number of bits in a byte.

4. The circuitry defined in claim 1 wherein said data output is one of a plurality of parallel data outputs.

5. The circuitry defined in claim 4 wherein said plurality of parallel data outputs is the number of bits in a byte.

6. The circuitry defined in claim 5 wherein successive aligned bytes are output one after another via the data outputs.

7. The circuitry defined in claim 1 further comprising a clock input.

8. A digital processing system comprising:
   processing circuitry;
   a memory coupled to the processing circuitry; and
   byte alignment circuitry as defined in claim 1 coupled to said processing circuitry and said memory.

9. A printed circuit board on which is mounted byte alignment circuitry as defined in claim 1.

10. The printed circuit board defined in claim 9 further comprising:
    a memory mounted on said printed circuit board and coupled to said byte alignment circuitry.

11. The printed circuit board defined in claim 9 further comprising:
    processing circuitry mounted on said printed circuit board and coupled to said byte alignment circuitry.

12. Circuitry for receiving and byte-aligning data comprising:
    byte alignment circuitry that uses a first special character selected by a special character selection signal from a plurality of different special characters having a plurality of different sizes in terms of how many bytes they include to detect byte boundaries in received data, and aligns the byte boundaries when enabled by a control signal to subsequently output byte-aligned data and a special character status signal indicative of which one of the special characters was used to align the byte boundaries; and utilization circuitry responsive to outputs of the byte alignment circuitry and selectively providing said control signal and said special character selection signal.

13. The circuitry defined in claim 12 wherein the byte-aligned data is output in parallel form.

14. The circuitry defined in claim 12 wherein said utilization circuitry comprises programmable logic circuitry.

15. The circuitry defined in claim 12, wherein said byte alignment circuitry outputs a pattern detect signal indicative of the presence of byte aligned data; and said pattern detect signal causes said utilization circuitry to disable said control signal.

16. The circuitry defined in claim 12, wherein said byte alignment circuitry automatically prevents alignment to subsequently received data containing byte boundary data after the byte boundaries have already been aligned.

17. The circuitry defined in claim 12, wherein said byte alignment circuitry provides data representing said first special character to said utilization circuitry.

18. The circuitry defined in claim 12, wherein said special character select signal can instruct said byte alignment circuitry to use a second special character selected from the plurality of different special characters to detect the byte boundaries in received data.

19. The circuitry defined claim 18, wherein said byte alignment circuitry re-aligns the byte boundaries using said second special character when enabled by said control signal.

20. Circuitry for receiving and byte-aligning data comprising:

byte alignment circuitry that processes received data and outputs byte-aligned data after byte boundaries are aligned, said byte alignment circuitry further comprising:

special character detection circuitry that detects a selected special character in the received data, said selected special character being selected, based on a selection signal, from a plurality of different special characters that have a plurality of different sizes in terms of how many bytes they include; and boundary adjustor circuitry that sets the byte boundaries when said selected special character is detected and criteria are met; and utilization circuitry that receives the outputs of said byte alignment circuitry.

21. The circuitry defined in claim 20, wherein said selection signal is hardwired to permanently select a particular one of the special characters from the plurality of different special characters.

22. The circuitry defined in claim 20, wherein said utilization circuitry provides said selection signal to select a particular special character from the plurality of different special characters.

23. The circuitry defined in claim 20, wherein said byte alignment circuitry disables said boundary adjustor circuitry independent of a control signal.

24. The circuitry defined in claim 20, wherein said utilization circuitry enables said boundary adjustor circuitry by providing a control signal to said byte alignment circuitry.

25. The circuitry defined in claim 20, wherein said byte alignment circuitry further comprises special character constructor circuitry.

* * * * *